United States Patent
Ito

(10) Patent No.: US 10,489,571 B2
(45) Date of Patent: Nov. 26, 2019

(54) INFORMATION PROCESSING APPARATUS DETERMINING PROPRIETY OF USE BASED ON AUTHENTICATION RESULT OF FINGERPRINT AUTHENTICATION PROCESS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Daisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 15/724,301

(22) Filed: Oct. 4, 2017

(65) Prior Publication Data

US 2018/0101670 A1  Apr. 12, 2018

(30) Foreign Application Priority Data

Oct. 11, 2016  (JP) .................................. 2016-200149

(51) Int. Cl.
*G06F 21/32* (2013.01)
*G06K 9/00* (2006.01)
(Continued)

(52) U.S. Cl.
CPC ............ *G06F 21/32* (2013.01); *G06F 3/0416* (2013.01); *G06F 3/0488* (2013.01); *G06F 21/84* (2013.01);
(Continued)

(58) Field of Classification Search
CPC ........ G06F 21/32; G06F 3/0488; G06F 21/84; G06F 3/0416; G06K 9/00087; G06K 9/0002
(Continued)

(56) References Cited

U.S. PATENT DOCUMENTS

| 2007/0092118 A1* | 4/2007 | Tachibana ............... A63F 13/10 382/125 |
| 2013/0287272 A1* | 10/2013 | Lu .......................... G06F 3/041 382/124 |

(Continued)

FOREIGN PATENT DOCUMENTS

| JP | 2010093635 A | 4/2010 |
| JP | 2012168768 A | 9/2012 |

*Primary Examiner* — Kambiz Zand
*Assistant Examiner* — Aubrey H Wyszynski
(74) *Attorney, Agent, or Firm* — Rossi, Kimms & McDowell LLP

(57) ABSTRACT

An information processing apparatus is capable of allowing an operation by a finger of which a fingerprint has not been registered, and of improving operability while holding security. A collating unit collates fingerprint information about a finger that touched a touch panel read by a reader unit with registered fingerprint information. A control unit permits an operation to the touch panel by the finger when the fingerprint information read is coincident with the registered fingerprint information, and does not permit the operation when the fingerprint information read is not coincident with the registered fingerprint information. The control unit permits an operation to the touch panel by a finger of which fingerprint information is not coincident with the registered fingerprint information when at least one piece of fingerprint information among a plurality of pieces of fingerprint information that the reader unit reads simultaneously is coincident with the registered fingerprint information.

5 Claims, 5 Drawing Sheets

(51) Int. Cl.
G06F 21/84 (2013.01)
G06F 3/041 (2006.01)
G06F 3/0488 (2013.01)

(52) U.S. Cl.
CPC ....... *G06K 9/0002* (2013.01); *G06K 9/00087* (2013.01)

(58) Field of Classification Search
USPC .......................................................... 726/18
See application file for complete search history.

(56) References Cited

U.S. PATENT DOCUMENTS

2015/0294172 A1* 10/2015 Aoki ................. G06K 9/00892
  348/77
2016/0253538 A1* 9/2016 Lu ....................... G06K 9/0002
  382/124
2017/0011623 A1* 1/2017 Kim ....................... G08C 17/02
2018/0181733 A1* 6/2018 Shim ...................... G04G 21/08

* cited by examiner

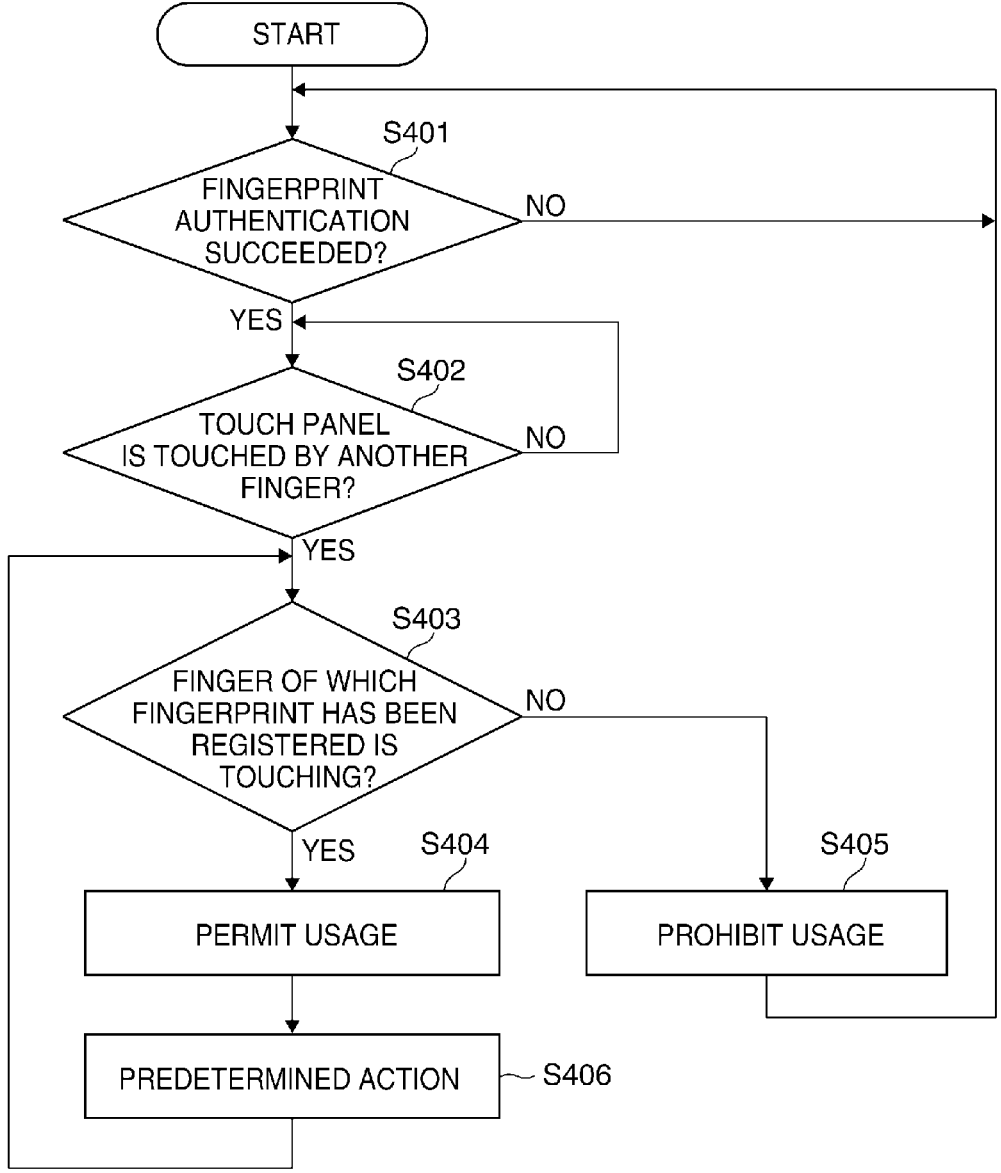

INFORMATION PROCESSING APPARATUS DETERMINING PROPRIETY OF USE BASED ON AUTHENTICATION RESULT OF FINGERPRINT AUTHENTICATION PROCESS, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus that determines propriety of use based on an authentication result of a fingerprint authentication process, a control method therefor, and a storage medium storing a control program therefor.

Description of the Related Art

Fingerprint authentication is one of personal identification methods used when information processing apparatuses, such as a smartphone and a personal computer (PC), are used. For example, Japanese Laid-Open Patent Publication (Kokai) No. 2010-93635 (JP 2010-93635A) discloses a technique of performing the personal identification whenever a user touches a fingerprint authentication sensor arranged on a display unit of an information processing apparatus. According to the technique disclosed in this publication, a fingerprint of a user's finger touched the fingerprint authentication sensor is repeatedly read after the user logs in to the information processing apparatus appropriately. Accordingly, even in a case where a user forgets a logout process, an operation by another person is not permitted, which prevents a leak of information. Moreover, Japanese Laid-Open Patent Publication (Kokai) No. 2012-168768 (JP 2012-168768A) discloses a technique of determining whether fingerprint information read whenever a fingerprint is detected by a fingerprint authentication sensor provided in a display unit of an information processing apparatus is coincident with a registered fingerprint information. According to the technique disclosed in this publication, since the fingerprint is automatically authenticated while the user is using the information processing apparatus, security is held without spoiling a user's usability.

However, since the above-mentioned conventional techniques do not allow authentication by a finger other than a finger of which a fingerprint has been registered in advance, a user cannot operate the information processing apparatus by a finger of which a fingerprint has not been registered.

SUMMARY OF THE INVENTION

The present invention provides an information processing apparatus, a control method therefor, and a storage medium storing a control program therefor, which are capable of allowing an operation by a finger of which a fingerprint has not been registered, and of improving operability while holding security.

Accordingly, a first aspect of the present invention provides an information processing apparatus including a reader unit configured to read fingerprint information about a finger that touched a touch panel, a collating unit configured to collate the fingerprint information read with the reader unit with registered fingerprint information, and a control unit configured to permit an input operation to the touch panel by the finger when the collating unit determines that the fingerprint information read is coincident with the registered fingerprint information, and not to permit the input operation to the touch panel by the finger when the collating unit determines that the fingerprint information read is not coincident with the registered fingerprint information. The control unit permits an input operation to the touch panel by a finger of which fingerprint information is not coincident with the registered fingerprint information when at least one piece of fingerprint information among a plurality of pieces of fingerprint information that the reader unit reads simultaneously is coincident with the registered fingerprint information.

Accordingly, a second aspect of the present invention provides a control method for an image processing apparatus, the control method including a step of reading fingerprint information about a finger that touched a touch panel, a step of collating the fingerprint information read with registered fingerprint information, a step of permitting an input operation to the touch panel by the finger when the fingerprint information read is coincident with the registered fingerprint information as a result of collation, and not permitting the input operation to the touch panel by the finger when the result of collation shows that the fingerprint information read is not coincident with the registered fingerprint information as the result of collation, and a step of permitting an input operation to the touch panel by a finger of which fingerprint information is not coincident with the registered fingerprint information when at least one piece of fingerprint information among a plurality of pieces of fingerprint information that are read simultaneously is coincident with the registered fingerprint information.

Accordingly, a third aspect of the present invention provides a non-transitory computer-readable storage medium storing a control program causing a computer to execute the control method of the second aspect.

According to the present invention, the operation by a finger of which a fingerprint has not been registered is allowed and the operativity is improved while holding the security.

Further features of the present invention will become apparent from the following description of exemplary embodiments with reference to the attached drawings.

BRIEF DESCRIPTION OF THE DRAWINGS

FIG. 4 is a flowchart of a control process according to a first embodiment of the information processing apparatus shown in FIG. 1A.

DESCRIPTION OF THE EMBODIMENTS

Hereafter, embodiments according to the present invention will be described in detail with reference to the drawings. Although the description of this embodiment assumes a personal digital assistant, such as a smartphone equipped with a touch panel, as an information processing apparatus of the present invention, the present invention is not limited to this.

Figure 1A:
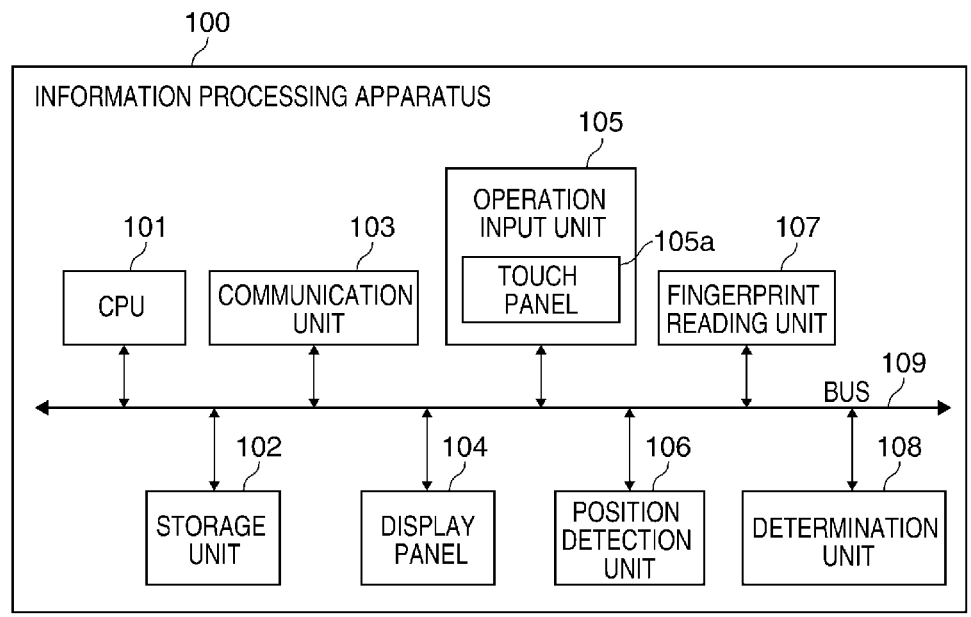
FIG. 1A is a block diagram schematically showing a configuration of an information processing apparatus according to an embodiment of the present invention.

FIG. 1A is a block diagram schematically showing a configuration of the information processing apparatus 100 according to the embodiment of the present invention. The information processing apparatus 100 is provided with a CPU 101, a storage unit 102, a communication unit 103, a display panel 104, an operation input unit 105, a position detection unit 106, a fingerprint reader unit 107, and a determination unit 108. The operation input unit 105 has a touch panel 105a.

The CPU 101 controls an action of each of the units constituting the information processing apparatus 100 by running a predetermined program stored in the storage unit 102 according to a user's instruction input through the operation input unit 105. Thus, the CPU 101 controls the entire action of the information processing apparatus 100. The storage unit 102 has a ROM that stores an OS program for the information processing apparatus 100 and control programs for controlling actions of the units constituting the information processing apparatus 100. Moreover, the storage unit 102 is provided with a flash memory, such as an EEPROM, that stores programs of applications (software) that are executable by the information processing apparatus 100 and parameters required for executing various programs. Furthermore, the storage unit 102 has a working area to which a program read from the ROM or the flash memory by the CPU 101 is developed and a RAM that has a storage area that temporarily stores various kinds of information treated by a program currently executed by the CPU 101. In this embodiment, the flash memory of the storage unit 102 shall store the below-mentioned fingerprint information that the user has registered in advance.

The communication unit 103 performs a data communication with an external device (not shown). The communication unit 103 communicates with the external device by a wireless communication or a cable communication, such as a wireless LAN communication, a wired LAN communication, a communication through a USB cable, and an infrared ray communication. The display panel 104 is an LCD (a liquid crystal panel), an organic EL panel, etc., and displays a GUI (Graphical User Interface), elapse information at the time of executing an application, a processing result, etc. It should be noted that the display panel 104 is provided with the touch panel 105a that is a component of the operation input unit 105. The operation input unit 105 has switches, buttons, etc. that receive user's various instructions in addition to the touch panel 105a. The position detection unit 106 detects a touch operation of a user's finger to the touch panel 105a, and notifies the CPU 101 of positional information (coordinate information), such as a position and motion of a touched point. The CPU 101 executes a predetermined process associated with an object on the basis of the positional information obtained from the position detection unit 106 and the positional information about the object (display object), such as an icon and an image, that is currently displayed on the display panel 104.

The fingerprint reader unit 107 repeatedly reads user's fingerprint information while the user is operating the touch panel 105a. At this time, the position detection unit 106 detects the position where the fingerprint reader unit 107 read the user's fingerprint information. The fingerprint information that the fingerprint reader unit 107 read and the positional information that the position detection unit 106 detected are sent to the determination unit 108. The user's fingerprint information read by the fingerprint reader unit 107 at the time of registration of the user's fingerprint information is saved to the storage unit 102. The determination unit 108 collates the fingerprint information read by the fingerprint reader unit 107 with the fingerprint information stored in the storage unit 102, and determines whether the fingerprint information read by the fingerprint reader unit 107 is coincident with the fingerprint information stored in the storage unit 102. A BUS 109 connects the units constituting the information processing apparatus 100 so as to enable communication. The CPU 101 controls actions of the units through the BUS 109.

Figure 1B:
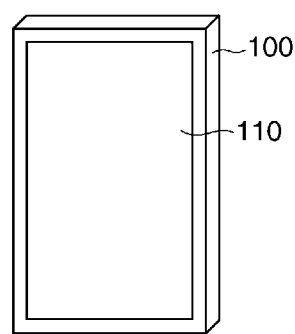
FIG. 1B is an external perspective view of the information processing apparatus shown in FIG. 1A.

FIG. 1B is an external perspective view of the information processing apparatus 100. The information processing apparatus 100 has the display unit 110 provided in the front of a body. It should be noted that a power switch etc. (not shown) are provided in the body of the information processing apparatus 100.

Figure 1C:
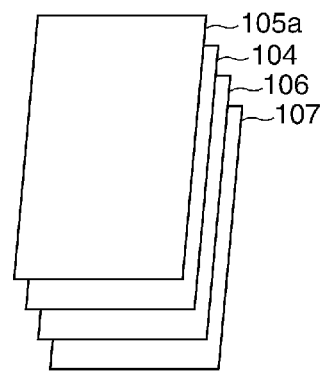
FIG. 1C is a schematic view showing a configuration of a display unit shown in FIG. 1B.

FIG. 1C is a schematic view describing a configuration of the display unit 110. The touch panel 105a, display panel 104, position detection unit 106, and fingerprint reader unit 107 are arranged in this order from a surface toward an inside of the information processing apparatus 100. When an instruction is input through the touch panel 105a by a predetermined touch operation to the screen of the display unit 110 by a user's finger, the CPU 101 performs a process of execution of the application corresponding to the input instruction. The fingerprint reader unit 107 consists of an image pickup device, such as a CMOS, that is able to pick up the finger that touched the touch panel 105a. Since the fingerprint reader unit 107 is arranged so as to cover all the back side of the position detection unit 106, a fingerprint of a finger can be picked up even if the finger touches any position of the touch panel 105a. Moreover, even when a plurality of fingers of the user touch the touch panel 105a simultaneously, the fingerprint reader unit 107 is capable of picking up the fingerprints of the fingers simultaneously. The determination unit 108 determines whether each of the plurality of pieces of the fingerprint information read by the fingerprint reader unit 107 is coincident with the fingerprint information stored in the storage unit 102. It should be noted that a fingerprint reading process by the fingerprint reader unit 107 and a fingerprint authentication process by the determination unit 108 may be performed in parallel to other processes.

Figure 2A:
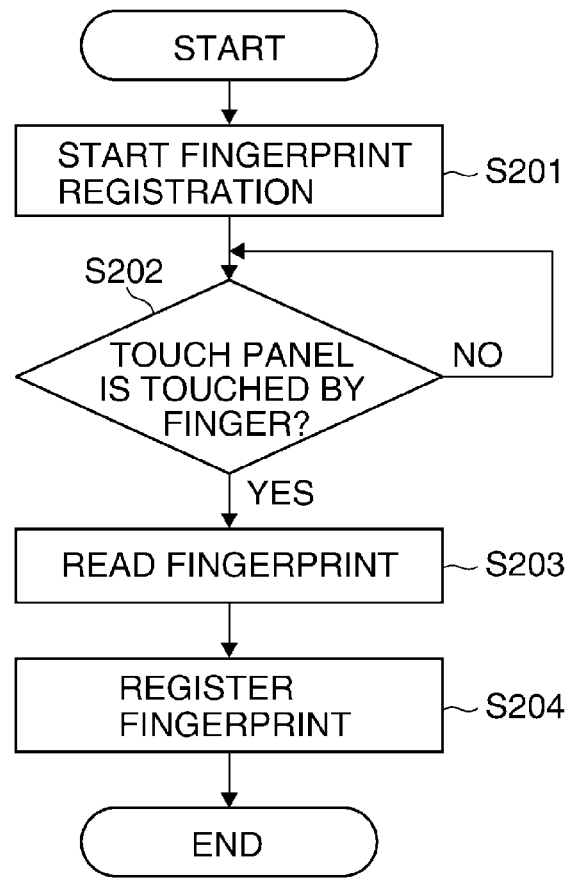
FIG. 2A is a flowchart of an initial fingerprint registration process executed by the information processing apparatus shown in FIG. 1A.
Figure 2B:
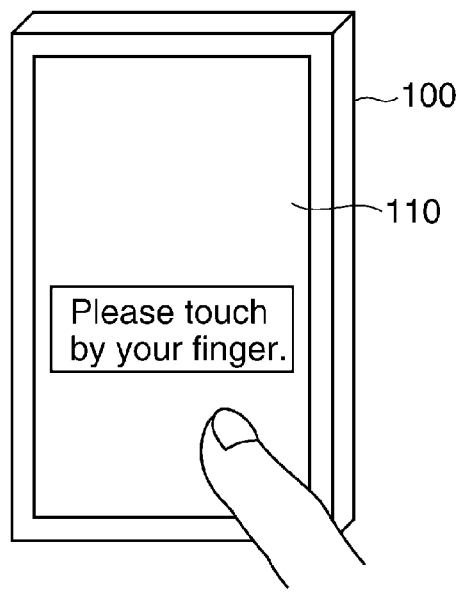
FIG. 2B is a view showing an example of a screen on the display unit at a time of starting the initial fingerprint registration process shown in FIG. 2A.

A user of the information processing apparatus 100 registers own fingerprint information in advance of use of the information processing apparatus 100. FIG. 2A is a flowchart of an initial fingerprint registration process executed by the information processing apparatus 100. The process of the flowchart in FIG. 2A is achieved when the CPU 101 runs a predetermined program stored in the storage unit 102 to control actions of the units of the information processing apparatus 100. In step S201, the CPU 101 starts the fingerprint registration process by running a predetermined program. Thereby, a fingerprint registration screen is displayed on the display unit 110. FIG. 2B is a view showing an example of the screen of the display unit 110 at the time of starting the initial fingerprint registration process. When the information processing apparatus 100 is started at the beginning, a message like "Please touch by your finger." that encourages a user's operation is displayed on the display unit 110. When a user's finger touches the touch panel 105a (display unit 110) according to the message, fingerprint information is read by the fingerprint reader unit 107 and is saved to the storage unit 102 of the information processing apparatus 100 as described below.

In step S202, the CPU 101 detects whether the user's finger touched the touch panel 105a. The CPU 101 repeats the determination in the step S202 until the finger touches the touch panel 105a (NO in the step S202). The CPU 101 proceeds with the process to step S203 when it is determined that the finger touched the touch panel 105a (YES in the step S202). In step S203, the CPU 101 reads the fingerprint of the finger by making the position detection unit 106 detect the position at which the user's finger touches the touch panel 105a and making the fingerprint reader unit 107 pick up the vicinity of the position detected by the position detection unit 106. In the following step S204, the CPU 101 saves the image of the fingerprint read in the step S203 to the storage unit 102. This finishes the process.

It should be noted that the fingerprint information saved to the storage unit 102 is not necessarily the image of the fingerprint, and may be information that is collatable with a fingerprint read by the fingerprint reader unit 107. For example, data evaluated from feature information about a fingerprint may be stored to the storage unit 102 in association with the fingerprint information.

Moreover, the fingerprint information is not necessarily need to be saved to the storage unit 102. For example, the fingerprint information may be saved to an external device (server etc. not shown) through the communication unit 103. In this case, the information processing apparatus 100 obtains fingerprint information from the external device, and collates it with the fingerprint read by the fingerprint reader unit 107 in the below-mentioned fingerprint authentication process by the determination unit 108.

Furthermore, the information processing apparatus 100 may register fingerprint information that is read by another fingerprint reader and is obtained through the communication unit 103.

Figure 3:
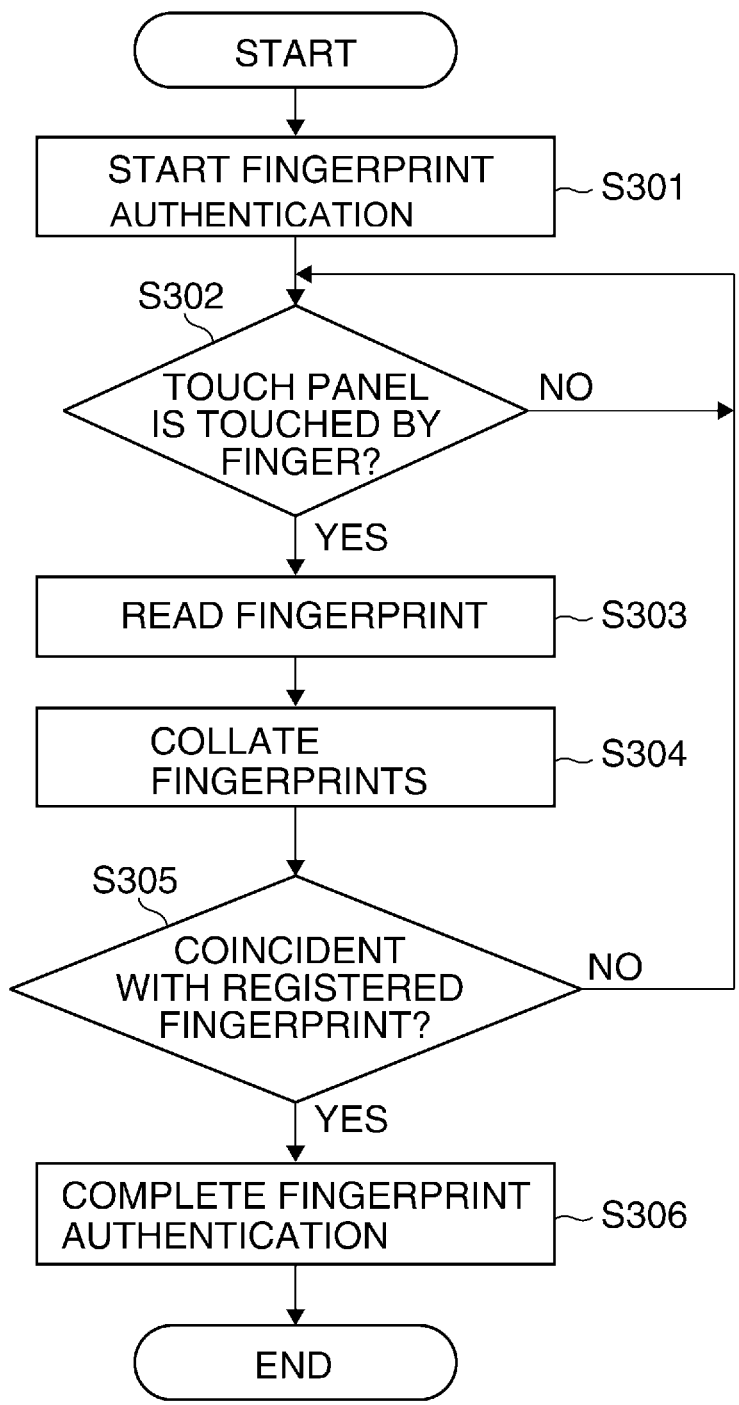
FIG. 3 is a flowchart of a fingerprint authentication process executed by the image forming apparatus shown in FIG. 1A.

FIG. 3 is a flowchart of a fingerprint authentication process executed by the image forming apparatus 100. Each process of the flowchart in FIG. 3 is achieved when the CPU 101 runs a predetermined program stored in the storage unit 102 and controls an action of each unit of the information processing apparatus 100. When detecting that the operation input unit 105 was operated in step S301, the CPU 101 starts the fingerprint authentication process.

In step S302, the CPU 101 detects whether the user's finger touched the touch panel 105a. The CPU 101 repeats the determination in the step S302 until the CPU 101 determined that the finger touched the touch panel 105a (NO in the step S302). When determining that the finger touched the touch panel 105a (YES in the step S302), the CPU 101 proceeds with the process to step S303. In the step S303, the CPU 101 reads the fingerprint of the finger that touched the touch panel 105a. Since the process in the step S303 is the same as that in the step S203, the description about the details is omitted.

In step S304, the CPU 101 collates the fingerprint read in the step S303 with the registered fingerprint (the fingerprint registered in the initial fingerprint registration process of the flowchart in FIG. 2A). In the following step S305, the CPU 101 determines whether the fingerprint read in the step S303 is coincident with the registered fingerprint by controlling the determination unit 108. When determining that the fingerprints are coincident with each other (YES in the step S305), the CPU 101 proceeds with the process to step S306. When determining that the fingerprints are not coincident with each other (NO in the step S305), the CPU 101 returns the process to the step S302. In the step S306, the CPU 101 permits the operation of the information processing apparatus 100 and finishes the fingerprint authentication process because the fingerprint authentication succeeded. This finishes the process.

It should be noted that the determination in the step S305 is "NO" even in a case where the initial fingerprint registration process is not performed. Moreover, the use of the information processing apparatus 100 is prohibited while the determination in the step S305 does not become "YES". Accordingly, when the determination in the step S305 does not become "YES" until predetermined time passes, a warning message or a message instructing the user to operate by the finger corresponding to the registered fingerprint on the display unit 110.

FIG. 4 is a flowchart of a control process according to a first embodiment of the information processing apparatus 100. Each process of the flowchart in FIG. 4 is achieved when the CPU 101 runs a predetermined program stored in the storage unit 102 and controls an action of each unit of the information processing apparatus 100. The fingerprint registration process described with reference to FIG. 2 shall be performed before executing a process in step S401.

In the step S401, the CPU 101 determines whether the fingerprint authentication process succeeded. Since the fingerprint authentication process was described with reference to the flowchart in FIG. 3, a detailed description is omitted. When determining that the fingerprint authentication does not succeed (the process does not proceed to the step S306 in the flowchart in FIG. 3), the CPU 101 repeats the determination in the step S401 and waits until the determination result in the step S401 becomes "YES". When determining that the fingerprint authentication succeeded (the process in the step S306 in the flowchart in FIG. 3 was executed, YES in the step S401), the CPU 101 proceeds with the process to step S402.

In the step S402, the CPU 101 determines whether a finger of which a fingerprint is other than the fingerprint authenticated by the fingerprint authentication in the step S401 touched the touch panel 105a. This description assumes a scene where the touch panel 105a of the information processing apparatus 100 is operated by two fingers including the finger of which the fingerprint has been registered and the other finger of which the fingerprint has not been registered. For example, this description assumes a scene where an image displayed on the display panel 104 of the information processing apparatus 100 is enlarged or reduced by spreading (pinch-out) or narrowing (pinch-in) a distance between the two fingers that touch the touch panel 105a. When determining that the other finger does not touch the touch panel 105 (NO in the step S402), the CPU 101 repeats the determination in the step S402. When determining that the other finger is touching the touch panel 105, the CPU 101 proceeds with the process to step S403.

In the step S403, the CPU 101 determines whether the finger of which the fingerprint has been registered is touching the position detection unit 106. Since the determination in the step S403 is performed in proportion to the steps S303 through S305 of the flowchart in FIG. 3, the description about the details is omitted. When determining that the finger of which the fingerprint has been authenticated in the step S401 is touching the touch panel 105a (YES in the step S403), the CPU 101 proceeds with the process to step S404. On the other hand, when determining that the finger of which the fingerprint has been authenticated in the step S401 is not touching the touch panel 105a (is detached from the touch panel 105a, NO in the step S403), the CPU 101 proceeds with the process to step S405.

In the step S404, the CPU 101 permits using the information processing apparatus 100 because both the finger of which the fingerprint has been registered and the finger of which the fingerprint has not been registered are touching the touch panel 105a simultaneously. Accordingly, the CPU 101 controls an action of the information processing apparatus 100 in response to an input operation according to motions of the fingers that are touching the touch panel 105a in the following step S406. The CPU 101 returns the process to the step S403 after the process in the step S406. On the other hand, in the step S405, the CPU 101 does not permit an operation by the finger that is touching the touch panel 105a because the CPU 101 determined that the finger of which the fingerprint has been registered is not touching the touch panel 105a. That is, the CPU 101 prohibit usage. Then, the CPU 101 returns the process to the step S401. In the step S405, a message showing that an operation is not permitted may be displayed on the display unit 110 (the display panel 104), for example. Moreover, when the information processing apparatus 100 is provided with a loudspeaker, an alarm sound may be sounded.

It should be noted that only the finger that the fingerprint authentication succeeded is touching the touch panel 105a when the determination in the step S402 becomes "NO". Accordingly, the flowchart in FIG. 4 may be modified so that the process proceeds to the step S404 when the determination in the step S402 becomes "NO" and the process returns to the step S402 after the process in the step S406. In this case, use of the information processing apparatus 100 is permitted even when the touch panel 105a is operated by only the finger that the fingerprint authentication succeeded in the step S401.

Moreover, although the process performed in the case where one finger of which a fingerprint has not been registered and the finger of which the fingerprint has been registered are touching the touch panel 105 simultaneously is described in the above-mentioned description, a process can be performed similarly in a case where two or more fingers of which fingerprints have not been registered and the finger of which the fingerprint has been registered are touching the touch panel 105 simultaneously. That is, if the finger of which the fingerprint has been registered is touching the touch panel 105a, an operation of the information processing apparatus 100 is permitted even if two or more fingers of which the fingerprints have not been registered are touching the touch panel 105a.

As mentioned above, the control method according to the flowchart in FIG. 4 permits the input operation to the information processing apparatus 100 through the touch panel 105a by a finger of which the fingerprint has not been registered while the finger of which the fingerprint has been registered is touching the touch panel 105a. On the other hand, when the finger of which the fingerprint has been registered is detached from the touch panel 105a, an input operation to the information processing apparatus 100 through the touch panel 105a by a finger of which a fingerprint has not been registered is not permitted. That is, when a person other than the user whose fingerprint has been registered operates the information processing apparatus 100, it is necessary that a finger (a genuine user's finger) of which a fingerprint has been registered touch the touch panel 105a. Such a configuration improves operability while holding security.

Incidentally, when an important input operation is given through the touch panel 105a, it is preferable to permit only an operation by a finger of which a fingerprint has been registered in order to secure higher security. For example, it is preferable to permit only an operation by a user's finger of which a fingerprint has been registered in payment of merchandise purchase using a WEB mail order etc. Accordingly, control that does not permit an operation by a finger of which a fingerprint has not been registered even if a finger of which a finger print has been registered is touching the touch panel 105a will be described as follows.

Figure 5A:
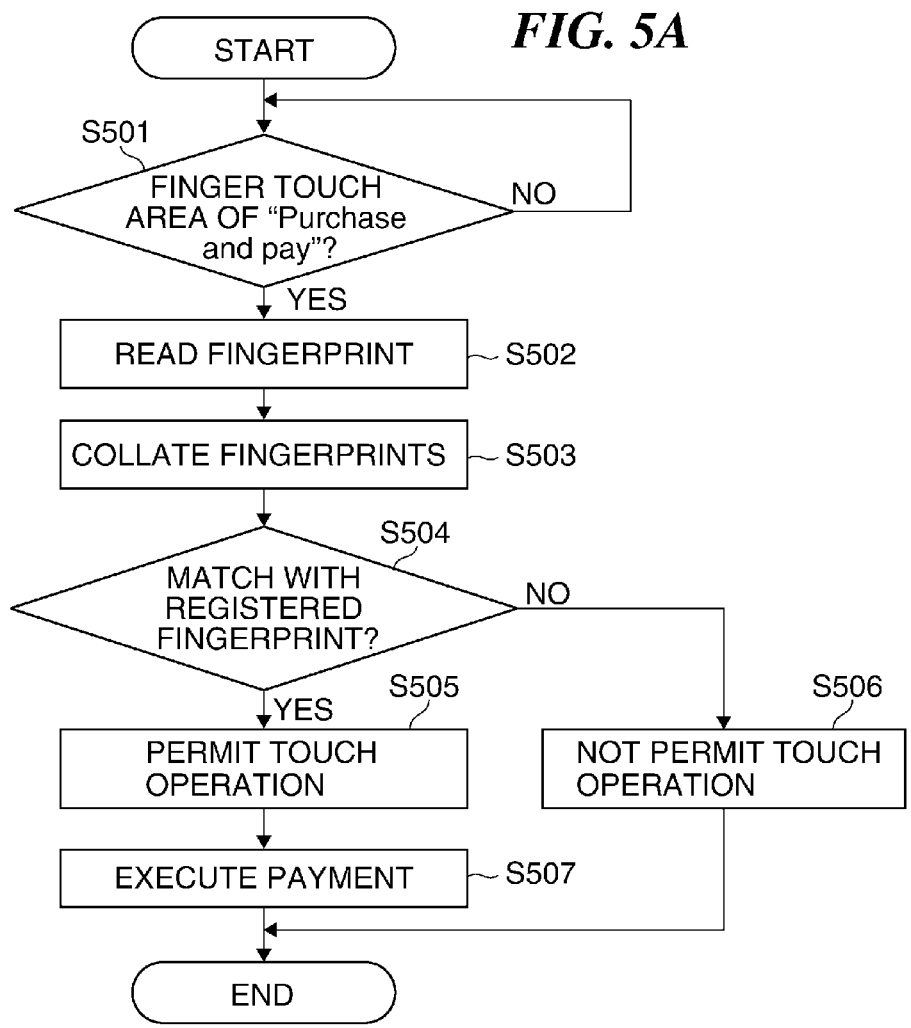
FIG. 5A is a flowchart of a control process according to a second embodiment of the information processing apparatus shown in FIG. 1A.
Figure 5B:
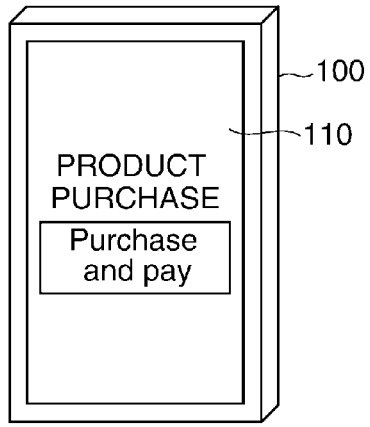
FIG. 5B is a view showing an example of the screen on the display unit displayed in the control process shown in FIG. 5A.

FIG. 5A is a flowchart of a control process according to a second embodiment of the information processing apparatus 100. The process of the flowchart in FIG. 5A is achieved when the CPU 101 runs a predetermined program stored in the storage unit 102 to control actions of the units of the information processing apparatus 100. It should be noted that the fingerprint registration process described with reference to FIG. 2 shall be performed before executing a process in step S501. Moreover, a payment screen for merchandise purchase shall be displayed on the display unit 110 because the user performed a suitable input operation to the information processing apparatus 100. FIG. 5B is a view schematically showing the payment screen displayed when a product is purchased from a predetermined menu of the information processing apparatus 100. A payment process is performed when a suitable touch operation (press operation) is performed to an area of "Purchase and pay" that is displayed on the display unit 110.

Consequently, in the step S501, the CPU 101 determines whether the finger touched the touch panel 105a in the area of "Purchase and pay" that is displayed on the display unit 110. The CPU 101 repeats the determination in the step S501 until the CPU 101 determines that the finger touched the area of "Purchase and pay" (NO in the step S501). When determining that the finger touched the area of "Purchase and pay" (YES in the step S501), the CPU 101 proceeds with the process to step S502. Subsequently, the processes in steps S502 and S503 are performed in order. Since the processes in the steps S502 and S503 are the same as the processes in the steps S303 and S304 of the flowchart in FIG. 3 (fingerprint authentication process), the description here is omitted.

In step S504, the CPU 101 determines whether the fingerprint read in the step S503 is coincident with the registered fingerprint by controlling the determination unit 108. When determining that the fingerprints are coincident with each other (YES in the step S504), the CPU 101 proceeds with the process to step S505. When determining that the fingerprints are not coincident with each other (NO in the step S504), the CPU 101 proceeds with the process to step S506. Since the CPU 101 determined that the finger of which the fingerprint has been registered touched the area of "Purchase and pay", the touch operation in the step S501 is permitted in the step S505. As a result, the CPU 101 performs the payment process in the following step S507, and thereby, this process is finished. On the other hand, since the CPU 101 determined that the finger of which the fingerprint has not been registered touched the area of "Purchase and pay", the touch operation in the step S501 is not permitted in the step S506. As a result, this process is finished without performing the payment process. It should be noted that a message of "Impossible to pay" may be displayed on the display unit 110 or an alarm sound may be sounded in the step S506 at the timing of finishing the process.

It should be noted that the control that the information processing apparatus 100 permits only an operation by a finger of which a fingerprint has been registered is not limited to the case of the above-mentioned purchase of a product and payment. The control is applied to a case where various kinds of personal information are input. Personal information includes credit-card information, log-in information for a specific WEB site, Internet banking (WEB payment, WEB transfer, etc. from a bank account), and a name and address of a user. However, the personal information is not limited to these. Thus, when important information is input, security is further improved by controlling so as to permit only an input operation by a finger of which a fingerprint has been registered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the above-mentioned embodiment is described while assuming a smartphone etc. as the information processing apparatus 100. However, the present invention is generally applicable to an apparatus that is provided with a touch panel and is capable of authenticating a fingerprint as a result of an operation to the touch panel. The present invention is applicable to electronic apparatuses, such as a digital camera, a video camera, a personal computer (tablet PC), a cell phone, a portable game apparatus, and an ATM (automatic teller machine).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-200149, filed Oct. 11, 2016, which is hereby incorporated by reference herein in its entirety.

What is claimed is:

1. An information processing apparatus comprising:
   a touch panel;
   a fingerprint reader configured to read fingerprint information about a finger that touches the touch panel;
   a processor; and
   a memory that stores instructions, which when executed by the processor, cause the information processing apparatus to:
   collate the fingerprint information read with the fingerprint reader with registered fingerprint information; and
   permit an input operation to the touch panel by the finger in a case where it is determined that the fingerprint information read is coincident with the registered fingerprint information, and not permit the input operation to the touch panel by the finger in a case where it is determined that the fingerprint information read is not coincident with the registered fingerprint information,
   wherein in a case where the fingerprint reader simultaneously reads a plurality of fingerprint information respectively corresponding to a plurality of fingers simultaneously touching the touch panel, an input operation to the touch panel by a finger of the plurality of fingers of which fingerprint information is not coincident with the registered fingerprint information is permitted when at least one fingerprint information among the plurality of fingerprint information read simultaneously is coincident with the registered fingerprint information.

2. The information processing apparatus according to claim 1, wherein the memory further stores instructions, which when executed by the processor, cause the information processing apparatus to not permit an input operation to the touch panel by a finger of which fingerprint information is not coincident with the registered fingerprint information in a case where the input operation is a predetermined input operation even if at least one fingerprint information among the plurality of fingerprint information read simultaneously is coincident with the registered fingerprint information.

3. The information processing apparatus according to claim 1, wherein the memory further stores instructions, which when executed by the processor, cause the information processing apparatus to save beforehand fingerprint information read with the fingerprint reader in a storage device as the registered fingerprint information.

4. A control method for an information processing apparatus, the control method comprising:
   reading fingerprint information about a finger that touches a touch panel;
   collating the read fingerprint information with registered fingerprint information;
   permitting an input operation to the touch panel by the finger in a case where it is determined, as a result of the collating, that the read fingerprint information is coincident with the registered fingerprint information, and not permitting the input operation to the touch panel by the finger in a case where it is determined, as a result of the collating, that the read fingerprint information is not coincident with the registered fingerprint information; and
   permitting, in a case where a plurality of fingerprint information, which respectively corresponds to a plurality of fingers simultaneously touching the touch panel, is simultaneously read, an input operation to the touch panel by a finger of the plurality of fingers of which fingerprint information is not coincident with the registered fingerprint information when at least one fingerprint information among the plurality of simultaneously read fingerprint information is coincident with the registered fingerprint information.

5. A non-transitory computer-readable storage medium storing a control program that causes a computer to execute a control method for an information processing apparatus, the control method comprising:

reading fingerprint information about a finger that touches a touch panel;

collating the read fingerprint information with registered fingerprint information;

permitting an input operation to the touch panel by the finger in a case where it is determined, as a result of the collating, that the read fingerprint information is coincident with the registered fingerprint information, and not permitting the input operation to the touch panel by the finger in a case where it is determined, as a result of the collating, that the read fingerprint information is not coincident with the registered fingerprint information; and permitting, in a case where a plurality of fingerprint information, which respectively corresponds to a plurality of fingers simultaneously touching the touch panel, is simultaneously read, an input operation to the touch panel by a finger of the plurality of fingers of which fingerprint information is not coincident with the registered fingerprint information when at least one fingerprint information among the plurality of simultaneously read fingerprint information is coincident with the registered fingerprint information.

* * * * *